United States Patent Office 2,783,189
Patented Feb. 26, 1957

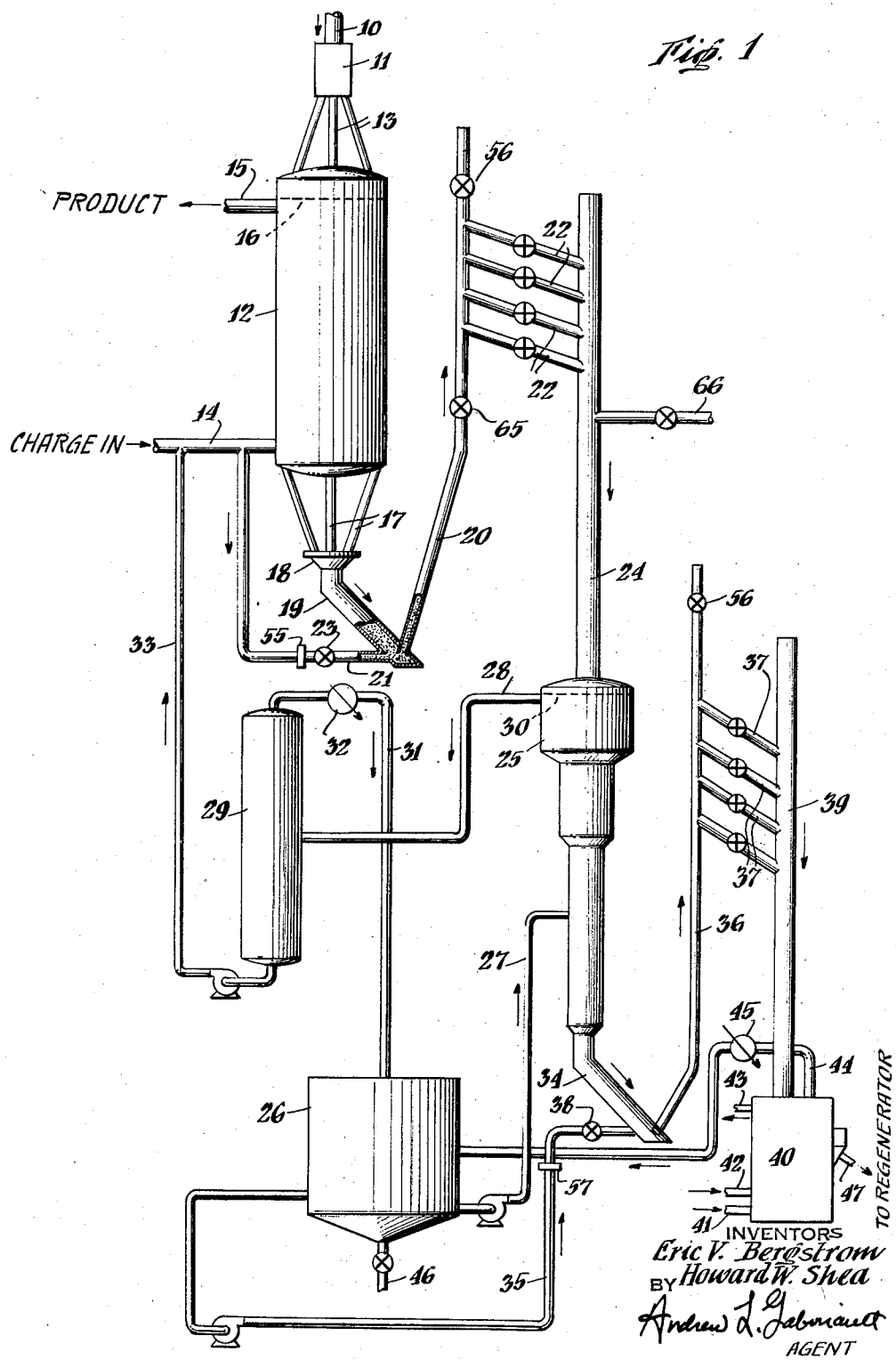

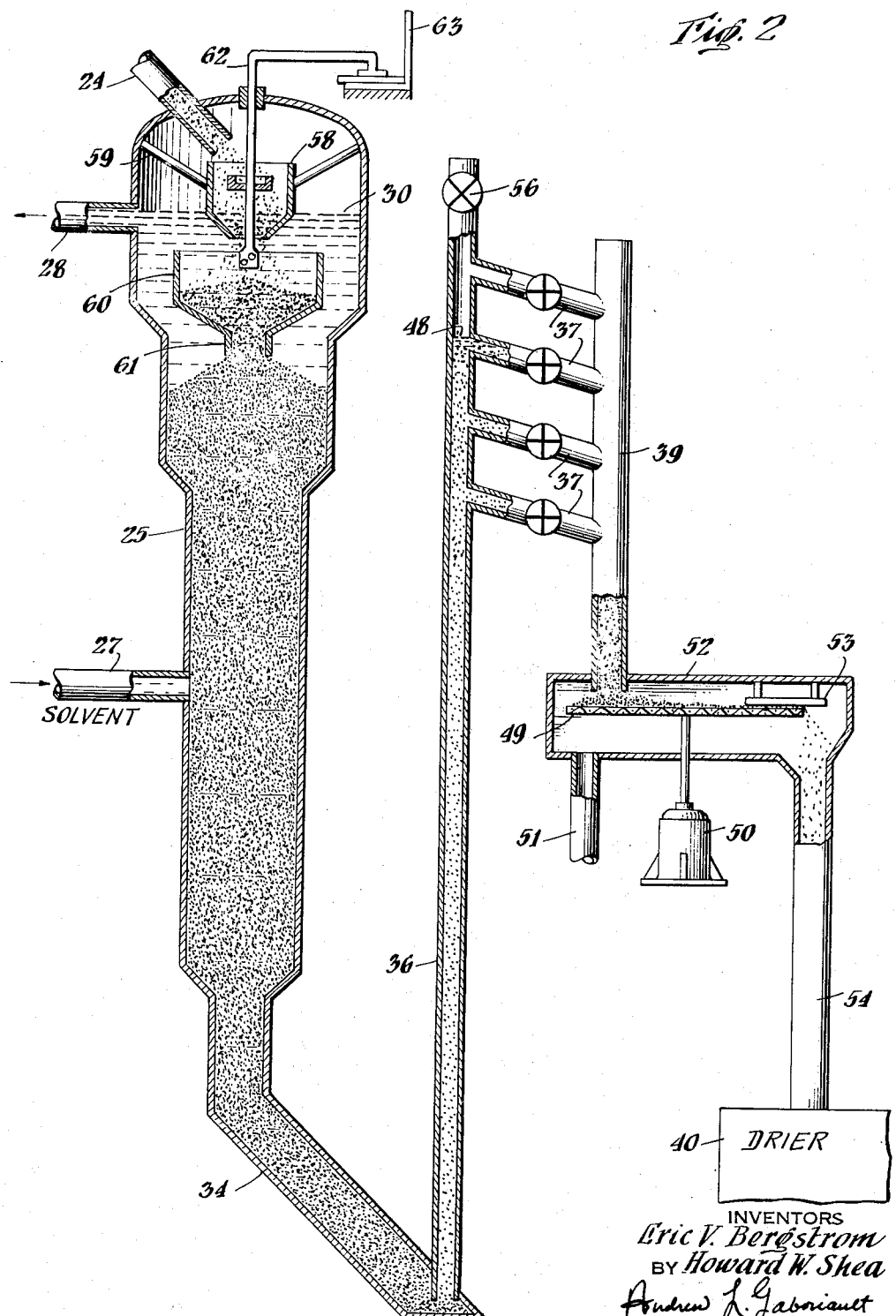

2,783,189

LIQUID-GRANULAR SOLIDS CONTACTING

Eric V. Bergstrom, Short Hills, and Howard W. Shea, West Deptford, N. J., assignors to Socony Mobil Oil Company, Inc., a corporation of New York Application April 22, 1954, Serial No. 424,956

9 Claims. (Cl. 196—147)

This invention is concerned with a method for the continuous controlled withdrawal of granular solids from a granular solids-liquid contacting zone.

Typical of the liquid-granular solids contacting processes to which this invention may be applied is the continuous, countercurrent contacting of liquid hydrocarbon oils, such as mineral oil, with a granular adsorbent, such as fuller's earth, for the purpose of decolorizing the oil and removing small amounts of impurities therefrom. Other processes with which this invention will find application include the continuous treatment of water with granular zeolites and the liquid phase conversion of hydrocarbons in the presence of granular materials, either of an inert or catalytic character.

In processes of the aforementioned types, as well as many others, it is usually desirable to pass the granular solids continuously through the liquid-granular solids contacting zone as a columnar mass. It is also necessary that the granular solids be continuously removed from the contacting zone at a controlled rate, so that the ratio of liquid to solids in the contacting zone be maintained at some constant optimum value. Such removal can, of course, only be accomplished by also removing, in the void space between the solid particles, a certain quantity of liquid so that after removal the granular solids will be so admixed with liquid as to form a slurry. It has been found that attempts to control the granular solids rate by interposition of a variable area flow restriction, such as a valve, in the line in which such a slurry is flowing are completely ineffectual. Flow rates obtained in this manner are neither reproducible nor reliable. At a given valve setting the rate of solids flow may suddenly change. A given valve setting will frequently give a widely different flow rate at different times, even though all other conditions are the same due to uncontrollable changes in the apparent viscosity of the mixture flowing through the restricted area. A further disadvantage of variable opening flow controllers, as well as any other types wherein the flow is controlled at some point below the contacting vessel, is that, should the flow regulation fail, for any cause, the contacting vessel might rapidly empty itself completely of solids. This is brought about by the fact that the entire static head of the liquid in the contacting vessel must be borne by any flow regulator which is situated beneath the contacting zone. The difficulties that such occurrences, even though infrequent, might entail are readily apparent to one familiar with this art. Liquid would flow in large quantity out of a conduit intended to carry primarily solids and probably connected to a vessel not designed to receive the liquid in such quantity. As an example, in the continuous lubricating oil percolation process described below, should the flow control fail between the treater and the washer, large quantities of oil might be dumped into the washer, completely upsetting conditions there, and entailing a considerable loss of valuable operating time, and presenting a hazard due to rapid increase in pressure by vaporization of cooler naphtha on mixing with hot oil and adsorbent.

A major object of this invention is to provide a method for removing granular solids from a liquid-granular solids contacting zone which overcomes the above-described difficulties.

Another object of this invention is to provide a method for reliably controlling the rate of granular solids removal from a liquid-granular solids contacting zone.

Another object of this invention is to provide a reliable method for controlling the rate of granular adsorbent removal from the treating and washing steps of a continuous lubricating oil decolorization process.

These and other objects will become apparent from the following discussion of the invention.

Broadly, the method of this invention for controlled withdrawal of granular solids from the liquid-granular solids contacting zone involves gravitating the granular solids downwardly from the zone as a seal column with the solids in the continuous phase. In the lower section of this column the solids are suspended in liquid and the suspension is then passed upwardly through a lift passage which is in full and open communication with the lower end of the seal column. The suspension is then discharged from the lift passage through one of a plurality of outlet passages which extend outwardly from a plurality of vertically spaced-apart points along the lift passage, all of which points lie below the liquid level maintained in the contacting zone. Rate control is effected, at least in part, by selective choice of the one of said outlet passages to act as the actual outlet, which gives the desired rate of flow. A decrease in flow is accomplished by using a higher outlet passage while an increase is effected by a lower outlet. Fundamentally, then, the rate is at least in part controlled by controlling the difference in static head between the liquid level in the contacting zone and that in the transport passage. The rate is altered by increasing or decreasing this difference.

This invention will be best understood by reference to the attached drawings, of which Figure 1 is an elevational view, partially in section, of a portion of a continuous lubricating oil percolation process employing this invention; and Figure 2 is an elevational view, partially in section, of the washer of a continuous percolation process employing a modified form of this invention.

Both of these drawings are diagrammatic in form and like parts in both bear like numerals.

Turning now to Figure 1, there is shown therein the washer and treater, with auxiliary vessels, suitable for use with a typical continuous lubricating oil percolation process of the type described and claimed in U. S. patent application, Serial No. 177,408, filed August 3, 1950, now Patent No. 2,701,786. The regenerated adsorbent passes from a regeneration zone (not shown) and is supplied through a passage 10 into a flow-splitting device 11, from which the adsorbent passes into the upper section of a treating vessel 12 through a plurality of passages 13, which terminate at uniformly spaced points within the treating vessel.

Typical adsorbents which may be employed are fuller's earth, bauxite, bentonite and bone char, charcoal, magnesium silicate, heat and acid-activated kaolin and activated carbon. Synthetic silica or alumina or silica-alumina gel adsorbents may also be employed.

The liquid oil may be treated for a variety of purposes, which include decolorization, removal of suspended, colloidal or dissolved carbon or coke or oxygen or nitrogen-containing impurities and other gum-forming compounds and improvement of the properties of the oil which relate to de-emulsification.

The adsorbent gravitates through the treating zone within vessel 12 as a columnar mass. A liquid hydrocarbon charge, such as a mineral oil or a fuel oil of low asphalt content, enters the system through passage 14. This oil may be preheated, prior to introduction to the treating vessel, to a suitable treating temperature that may lie within the range 0-700° F., and should generally be below the flash point of the oil. In a typical mineral oil decolorization process, the treating temperature might be about 300° F.

The heated charge passes into the lower section of the treating zone and then upwardly countercurrently through the descending columnar mass of adsorbent which effects the desired treatment of the oil. Treated product is removed through passage 15 so that a liquid level is maintained in the upper section of the treating vessel at about the level of line 16. The spent adsorbent, bearing the impurities removed from the oil, gravitates from the lower section of the treating zone through a plurality of passages 17. The adsorbent will gravitate, in this invention, through these passages as a column with adsorbent in the continuous phase, that is, each particle will be touching, at substantially all times, all particles that surround it, with liquid oil filling the spaces between the adsorbent particles. The adsorbent streams from passages 17 are combined into a single column or stream within funnel-shaped member 18 and then passed downwardly through a single conduit 19 as a columnar mass. The continuous column of adsorbent formed within passage 19, member 18 and passages 17 acts as a seal leg of sufficient length to prevent excessive flow of liquid upwardly or downwardly through the leg from the treating zone. Connecting into the lower end of conduit 19 is a transport pipe or passage 20. The downwardly facing open inlet end of this transport pipe is in free and open communication with the lower section of the seal column maintained within conduit 19. Liquid oil is added to the seal column adjacent its lower end through passage 21. Extending outwardly from the transport pipe 20, at a variety of points vertically spaced-apart along the transport pipe, are a plurality of outlet or discharge passages 22. Each of these passages extends from the transport pipe at levels below the level 16 of liquid maintained within the treating zone. The seal column, transport passage and outlet passages may be operated, according to this invention, to effectively control the rate of adsorbent withdrawal from the treating zone with little danger that the zone will empty itself of adsorbent in a rapid, uncontrollable fashion.

At the entrance to the transport pipe, in the lower section of the seal column within conduit 19, adsorbent is suspended in the liquid oil which is added to the seal column from passage 21. This suspension then flows upwardly through transport passage 20 and is discharged therefrom through only one of passages 22. Passages 22 are made of sufficient size so that they do not act as flow throttles on the stream passing through. Therefore, the suspension will rise in transport passage 20 to the height of the lowest one of passages 22 which is open. Normally, only one of such passages will be open at a time, although passages above the lowest may be open without in any way affecting the operation. The rate may be controlled in one of several different ways within the scope of this invention. The rate may be completely controlled by selective choice of the one of passages 22 to act as an outlet, which choice is governed by the rate desired. For a given size of seal leg and transport passage, the flow rate obtained with a constant addition of liquid through pipe 21 will be governed by the static head between the liquid level 16 in the treating zone and that in the transport pipe 20. Thus, the maximum rate will be obtained by opening the lowest of passages 22, since this gives the greatest difference in head between treating zone and lift passage. The rate can be decreased by opening successively higher of passages 22 while closing those below.

In many installations the variety of rates given by four or five spaced-apart outlets 22 will be sufficient for adequate rate control of the process without any additional means of further controlling the rate. However, in some cases where the rate is a more critical factor, it may be desired to operate at some rate intermediate between those given by adjacent passages 22. This may be accomplished in this invention by first regulating the rate by selective choice of the one of passages 22 to act as outlet which gives a flow rate closest to the one desired. Adjustment to the exact rate desired may then be had by regulating the amount of liquid added through line 21 by manipulation of valve 23. Opening the valve will increase the addition of liquid to the lower end of the lift passage and thus increase the flow rate when any one given passage 22 is acting as the outlet. A fixed orifice 55 is provided in line 22 having an opening of sufficient size that, regardless of any pressure fluctuations in line 21 or the extent to which valve 23 is opened, the addition of oil to the seal column can never approach a rate where the possibility that the treater will be rapidly emptied of adsorbent exists. The adsorbent oil mixture passes from outlet passages 22 into a downwardly directed passage 24, which also is of sufficient size so as not to throttle the flow of the stream from the outlet passage. This mixture then passes directly into the washer 25. It will, in most installations, be desirable to provide some means for measuring the height of the adsorbent bed in the treater and control the adsorbent withdrawal rate in conjunction with this measurement, as explained below.

A third method of rate control is possible using the apparatus shown in connection with the treater of Figure 1. As is apparent from the foregoing, in this invention the difference in static head between the liquid level in the contacting vessel and that in the transport passage is used to overcome the pressure drop, due to the suspension flowing through the transport passage below the outlet at the desired rate. Thus, if it is desired to change the range of flow rates produced by a given set of outlets to a lower range of flow rates, an additional restriction on flow may be interposed in the transport passage 20 below the outlet passages 22 by partially closing valve 65 there provided. The rate may then be controlled in a new range by selectively choosing among the outlets 22. In addition, where a rate between the rates produced by using a given pair of outlets is desired, it may be accomplished by using the lower of the two outlets so that a rate above that desired would be produced and then achieving the desired rate by throttling down on valve 65, thereby interposing an additional flow restriction and pressure drop in the transport passage.

The upper end of the transport passage 20 may be vented by opening valve 56. However, in most installations this will not be necessary because the solids are in free fall through passage 24 and, therefore, no back pressure on the stream in the transport passage will exist.

In many installations, also, it will be desirable to use in the washer a solvent which boils at a temperature level below that used in the treating zone. Even where this is not the case, it is frequently desirable to cool the adsorbent from the treating zone, where the treating zone is operated at an elevated temperature, in order to avoid the impurities being dissolved from the adsorbent by the liquid wash solvent at higher temperatures. In order to provide this cooling, a cold stream of wash solvent may be injected into passage 24 through passage 66, which will then act to reduce the adsorbent temperature to one suitable for use in the washing zone before the adsorbent reaches the washing zone proper.

The spent adsorbent gravitates through the washing zone within washer 25 as a columnar mass. It will be noted that washer 25 is made up of three different sections having different diameters. Columnar mass will generally extend through the lower two of these sections, with the upper one being maintained as a settling zone to insure that adsorbent is not carried out with the effluent solvent. Fresh solvent is pumped from a tank 26 through line 27 into the lower section of washer 25. Typical solvents which may be used include carbon tetrachloride, normal heptane, normal octane, petroleum naphtha boiling within the range 100–400° F. and carbon disulfide. A preferred solvent is a paraffinic naphtha boiling within the range 210–300° F. The washing step may be conducted at atmospheric pressure or at pressure either above or below atmospheric, and at any temperature below that at which substantial vaporization of the solvent occurs, for example, 60–250° F.

The solvent is supplied to washer at a level substantially above the lower end of the columnar mass therein. This insures that there will be a substantial length of compacted adsorbent below the level of solvent inlet. The solvent passes upwardly through the columnar mass above the inlet and removes from the adsorbent, adhering liquid oil. Because of the solution of the oil in the solvent, the solvent will increase in viscosity as it passes upwardly through the washing zone. For this reason, the intermediate sized section of vessel 25 is provided so that the upper end of the columnar mass will not exist in a fluidized condition as a result of this increased viscosity. The solvent-oil solution is removed from the upper section of the washer through passage 28 and supplied to a fractionator 29. This removal causes a liquid surface to be formed within the washer at about the level indicated by dashed line 30. Within fractionator 29 the solution is separated into a solvent fraction which passes overhead through passage 31, is condensed by condenser 32 and returned to tank 26, and a recycle oil bottoms, which is removed through passage 33 and returned to the treating zone. The washed adsorbent gravitates from the washer as a seal column with the solids in the continuous phase and passes downwardly through conduit 34 admixed with adhering solvent. A stream of solvent is supplied to the lower section of this seal column through passage 35, which draws solvent from tank 26. Adsorbent in the lower section of the seal leg is suspended in the wash naphtha added and the suspension is then passed upwardly through transport passage 36, which acts in much the same manner as transport passage 20. A plurality of outlet passages 37 extend from transport passage 36, at a plurality of levels, all of which lie below the liquid surface level 30 maintained in the washing zone. Rate control is maintained in the same manner as described previously, the rate being set, at least in part, by using the one of passages 37 as the actual outlet passage which gives the desired rate. Here, again, a fine adjustment may be made by regulating the stream which enters through passage 35 by means of valve 38. An orifice plate 57 is provided in line 35 to perform the same function as orifice 55 in line 21. The adsorbent-solvent mixture from the outlet passages passes down through conduit 39 into a drier 40. This drier may be of any type suitable to evaporate solvent from the adsorbent. Shown in Figure 2 is a drier of the fluidized bed type, in which steam is supplied through passage 41. This steam acts to fluidize the adsorbent within the drier and evaporate from it the adhering solvent. Heat transfer coils may be maintained within the drying zone and they may be supplied with a suitable heat transfer fluid through passage 42. The heat transfer fluid may be removed through passage 43. A solvent-steam mixture passes overhead from the drier through passage 44 and condensation thereof is effected by condenser 45. The condensed material is then supplied to tank 26, from which the water may be removed through passage 46 while the solvent will mingle with the main body of solvent in the tank to be re-used in the washing zone. Dried adsorbent passes from the drier 40 through passage 47 and may then be supplied to a regeneration zone (not shown), such as a kiln, in which the impurities on the adsorbent may be removed by burning. The regenerated adsorbent is then returned to the treating zone for re-use therein.

Figure 2 shows an alternate form of this invention as applied to an adsorbent washer of the type shown in Figure 1. Adsorbent gravitates from the washer 25 as a seal column. Connecting into the lower section of this seal column is a confined transport passage 36 which extends upwardly from a downwardly facing open inlet end. In the method of Figure 2, there is no liquid stream supplied to the lower section of the seal column. Rather, the liquid needed to suspend the adsorbent and retain it in suspension within the transport passage is provided by making the seal column of sufficient size that liquid will flow from the washing zone through the seal column in a quantity that when forced into transport passage 36 by the difference in liquid head between washer and transport passage, will necessarily be increased in velocity above the velocity required to suspend the adsorbent. This suspension will then pass upwardly through the transport passage. Rate control will be effected entirely by selective choice among outlet passages 37, as previously described. Choosing a higher passage will decrease the static head difference between the level 30 in the washer and the level 48 in the transport passage, and thus decrease the amount of liquid which will flow downwardly through the seal column in passage 34. The solvent-adsorbent mixture flows from the outlet passage into passage 39. In the system of Figure 2, excess solvent is then drained from this mixture by supplying it to a suitable draining device. One such device is illustrated. It consists of a circular screen 49 lying in a horizontal plane and adapted to be rotated about its vertical axis by means of a motor 50. The solvent-adsorbent mixture drops from passage 39 onto the surface of this rotating screen. Solvent passes through the screen and is removed through passage 51, which extends from the housing 52 that encloses the screen. The adsorbent is carried around the screen by its rotation and removed by scraper 53. The adsorbent drops from the screen into passage 54 and is supplied to drier 40. This rotating screen may be of the type described in U. S. patent application, Serial No. 376,687, filed August 26, 1953. It should be emphasized, however, that that application is drawn to the use of such a screen as a rate control device. The screen in this case would merely act as a drainer, the rate control being accomplished as above described. The use of a drainer, while it adds to the cost of installation, may be advantageous where the drier is not of sufficient size to evaporate all of the liquid that passes with the adsorbent through the transport passage.

It is recognized that the elevation of granular solids by means of liquid lifts has been disclosed in the prior art. The flow rate of granular solids in all these cases, however, was controlled by varying the quantity of liquid supplied to the lift passage from some exterior source. In this invention such quantity remains, in many cases, entirely constant. The variation in flow is obtained by variation of a static head differential rather than varying liquid addition adjacent the lower end of the transport passage. Where some variation of this liquid addition is used to control rate in this invention, it is minor compared to the major rate control obtained by varying the outlet from the transport passage.

One significant advantage of the method of this invention is the substantially lower volume of supernatant liquid that is obtained over systems where the rate is controlled by a liquid jet, such as an eductor. The term "supernatant oil," as used herein, defines a quantity determined by sampling the effluent stream from the transport passage and allowing the solids to settle out of the sample. The volume of solids, with liquid in the pores and voids is measured and the volume of clear liquid also measured. Supernatant oil is then determined by expressing the volume of clear liquid as a percentage of the volume of solids or, stated as a formula:

$$\text{Supernatant liquid} = \frac{\text{Volume of clear liquid} \times 100}{\text{Volume of solids}}$$

Obviously, this quantity is a measure of the amount of liquid that must, in some manner, be separated from the solids after removal from the contacting zone and, equally obviously, the lower the supernatant liquid the more desirable the solids withdrawal method, since the separation problem, in most cases, is proportionately decreased. With the method of this invention supernatant liquid of about 20 to 50 percent is normally encountered. Using a liquid jet, such as an eductor, to control the rate, the supernatant liquid will usually fall within the range about 200 to 500 percent.

A further advantage of this invention over those using a liquid jet for control is that a much shorter seal leg from contacting zone to the transport system is required, since increased rate can be obtained by merely lowering the outlet rather than having to raise the liquid pressure at the lower end of the lift and seal column. The method of this invention has the further advantage that, should the rate control fail, there is much less chance of the contacting vessel being emptied, before necessary steps can be taken, than with other rate control systems. It will be noted that the control point here is at the upper end of the transport passage. Thus, the pressure of the entire static head in the contacting vessel is not exerted on the rate control point. Even if the lowest outlet passage is used and no solids are being supplied to the vessel, there is not sufficient head forcing the suspension through the transport passage to cause the contacting vessel to empty at any rapid rate. This is to be contrasted with systems where any poor settling of a rate control device is rapidly reflected in the contacting vessel because the entire head of liquid in the vessel is exerted on the rate control device.

It is normally desirable, when using this invention, to provide for some means of measuring the granular solids bed level so that the rate of solids may be adjusted to maintain a constant bed level. One such device is illustrated in Figure 2. The solids enter through passage 24 and are supplied to a funnel-shaped member 58 rigidly fixed in the upper end of the contacting vessel by rods 59. Adsorbent drops from member 58 into a receptacle 60 with an opening fitted with a nipple 61 in its bottom. Receptacle 60 is supported by rod 62, which extends slidably through the upper end of vessel 25. Exterior to vessel 25 member 62 bears on a scale 63. In operation, then, the upper end of the columnar mass is situated within receptacle 60 and the weight of receptacle and material is constantly recorded by scale 63. This weight is a measure of the amount of solids in receptacle 60 and, therefore, a measure of the height of the solids therein. Other level measuring devices, well known to the art, such as those described and claimed in U. S. patent applications, Serial Nos. 387,743 and 387,744, both filed October 20, 1953, are also well suited for use in conjunction with this invention.

In this invention the granular solids particles in the seal leg or column, with the exception of the lower section where the particles are suspended, should touch each other as they move downwardly so that the solids may be said to be in the continuous phase as opposed to a condition when the particles are separated from each other and, therefore, the liquid is in the continuous phase. Generally, the seal column should exist as a substantially compact column. To insure this, the seal column passage should have a diameter at least 4 times and preferably at least 6 times the transport passage or, if they are not circular in shape, the area difference between the two should correspond to that given by the specified diameter limits. Moreover, liquid should not be added to the base of the seal column in a quantity such that an amount of liquid flows up the column sufficient to cause the liquid to be in the continuous phase rather than the granular solids. It is generally preferable that there be no liquid flow up through the seal column but, if desired, a small upward flow can be tolerated if, as previously stated, the solids remain in the continuous phase. The seal leg should be so sized that the flow rate of solids and liquid through the leg never exceeds 350 cubic feet per minute per square foot of leg cross-section. This limit is critical to obtaining uniform, reliable flow through the leg.

The outlet passages 22 and 37 should have a flow capacity equal to and preferably greater than the transport passage, so that they do not in any manner restrict the flow of suspension therethrough.

The average velocity of the suspension in the transport passage should, of course, be sufficiently high to maintain the granular solids in the passage in suspension. Generally, this velocity should be at least 0.1 foot per second. However, to avoid an excessive quantity of supernatant liquid existing with the solids as they exit from the transport passage, the velocity in the transport passage should not exceed 8 feet per second and preferably should not exceed 4 feet per second.

The outlet passages should be spaced so that a range of operating heads is obtained suitable to give the liquid range of flow rates. The operating head is here used to mean the difference between the liquid level in the contacting vessel and the liquid level in the transport passage. For commercial continuous percolation processes, it is desirable to provide a range of outlets such that the operating head may be varied within the range 5 to 20 feet. A range of 5 to 12 feet of operating head will be suitable in many installations. Where a suitable range of operating heads permits, it is generally desirable to use a transport passage of about 25 to 50 feet in height in commercial lubricating oil treating systems. However, this height is not to be considered a limitation on apparatus by means of which this invention may be practiced, since it is operable with transport passages of any height.

The quantity of liquid added to the lower end of the seal column should generally be within the range about 0 to 5 gallons per minute and preferably 0 to 3 gallons per minute in commercial lubricating oil treating systems. This again is not a limiting factor in this invention and operation may, in many cases, be satisfactory at other rates of liquid addition.

The lowest point on the transport passage should be the inlet. A transport passage which dips down below the inlet point before extending upwardly has been found unsuitable because of the difficulty in suspending the solids in the inlet section of the transport passage. If desired, liquid jets may be provided along the length of the transport passage to assist in starting up the device after a shut-down when a column of compacted solids may exist in the transport passage. These jets would not be used in normal operation, however.

As an example of this invention, its application to a continuous lubricating oil percolation process will be considered. The arrangement was very similar to that shown in Figure 1. Clay adsorbent and oil were removed from the treater through a plurality of pipes which fed to a common collector, as shown in Figure 1. From the collector extended downwardly an 8 inch pipe about 13 feet long which acted as a seal leg. This pipe was inclined at an angle so that its lower end did not lie vertically beneath the center line of the treater. Extending vertically upwardly from within the lower section of this 8 inch pipe was a 1½ inch pipe to act as transport passage. A 1 inch line connected into the lower section of the 8 inch pipe. This line was for the supply of liquid oil at a rate of about 5 gallons per minute. The lower end of the transport pipe was spaced above the closed off end of the 8 inch pipe. The transport pipe extended upwardly to a level above the level of oil removal from the treater and was about 50 feet long. Five equally spaced-apart outlet passages equipped with valves were provided along the upper section of the transport passage. These outlet passages were so spaced that the difference in height between the liquid level in the treater and that in the percolator could be adjusted over the range 10 to 22 feet. This system was designed to remove the adsorbent from the treater at about a rate of 15 gallons per minute. The adsorbent would exist at about 350° F. as it was removed from the treater. The hot adsorbent and oil discharged from the transport passage through the outlet passage into a 4 inch pipe which connected into the upper end of the washer. The adsorbent and oil dropped through this pipe into the washer which was situated beneath the treater. About half way down this 4 inch pipe a stream of naphtha, at about 120° F., entered and acted to cool the falling adsorbent and oil, so that the entire mixture would be at about 200° F. as it entered the washer.

The transfer system from the washer to the drier in the above design was identical with that described above, except that a 6 inch pipe of 18 feet in length extended directly from the washer rather than the plurality of pipes, collector and 8 inch pipe used in the treater draw-off system. In addition, in order to insure a compact seal leg at all times, the wash naphtha was introduced 5 feet above the lower end of the washer. The wash naphtha adsorbent mixture was passed directly to the drier without intermediate draining.

It is understood that it is intended to cover herein all the changes and modifications of the example of this invention, chosen herein for purposes of disclosure, which do not constitute departures from the spirit and scope of the invention.

We claim:

1. A method for controlled withdrawal of granular solids from a confined liquid-granular solids contacting zone, which comprises: passing granular solids downwardly from the contacting zone as a seal column with the granular solids particles in the continuous phase; suspending granular solids from the lower section of the seal column in liquid and passing the suspension upwardly through a confined transport passage, the lower end of which transport passage is in free and open communication with said seal column; discharging the suspension from the transport passage through one of a plurality of vertically spaced-apart discharge passages which connect into said transport passage at a plurality of levels, all lying below the liquid level in the contacting zone and which are of sufficient size so as not to impose a flow restriction on the flowing suspension; and controlling the rate of solids removal from the contacting zone, at least in part, by selectively withdrawing the suspension through the one of said discharge passages suitable to give the desired flow while permitting no withdrawal through the other discharge passages, an increase in flow being accomplished by using a lower discharge passage and thereby lowering the level of withdrawal from the transport passage, while a decrease is effected by using a higher discharge passage and thereby raising the level of withdrawal from the transport passage.

2. A method for accomplishing the withdrawal of granular solids from confined liquid-granular solids contacting zones, which comprises: passing granular solids downwardly from a confined liquid-granular solids contacting zone as a column of solids with the solids in the continuous phase; removing granular solids from the lower end of said column and suspending said solids in a transport liquid; passing the suspension so formed upwardly through a confined transport passage, the lower end of which is in free and open communication with the lower section of said seal column; injecting liquid into said seal column adjacent the lower end of said transport passage to act as said transport liquid; discharging the suspension from said transport passage through only one of a plurality of outlet passages connecting into said transport passage at a plurality of vertically spaced-apart levels, all lying substantially below the liquid level maintained in said contacting zone, said outlet passages each having a flow capacity at least equal to said transport passage; controlling the rate of granular solids removal from the contacting zone, at least in part, by controlling the difference in height between the liquid level in the contacting zone and the height to which the suspension rises in the transport passage and controlling said difference in height by selectively using the one of said outlet passages for removal of the suspension which gives the difference in height required to accomplish the desired rate of granular solids removal.

3. A method for the controlled withdrawal of granular solids from a confined liquid-granular solids contacting zone, which comprises: passing granular solids admixed with liquid oil downwardly as a substantially compact seal column extending from the contacting zone of substantially less cross-section than the contacting zone; suspending the granular solids in the liquid which has moved through the seal column with the solids and passing the suspension upwardly through a confined transport passage without addition of liquid adjacent the lower end of the transport passage, which transport passage extends upwardly from an inlet in free and open communication with the seal column; maintaining the relative horizontal cross-section of seal column and transport passage such that liquid will pass downwardly through the seal column in sufficient quantity that when said quantity enters said transport passage it will pass upwardly through the transport passage at a velocity exceeding 0.1 foot per second thereby maintaining the granular solids in suspension within the transport passage; discharging the suspension from the transport passage through only one of a plurality of vertically spaced-apart discharge passages which connect into the transport passage at a plurality of levels, all lying below the liquid level in the contacting zone; and controlling the rate of granular solids removal from the contacting zone by selectively withdrawing the suspension through the one of said discharge passages which gives the desired rate while not permitting flow through the remainder of said discharge passage, an increase in flow being accomplished by selecting a lower discharge passage for use thereby lowering the level of withdrawal from the transport passage, while a decrease is effected by using a higher discharge passage thereby raising the level of withdrawal from the transport passage.

4. In a continuous lubricating oil percolation process wherein a granular adsorbent is gravitated downwardly through a confined treating zone countercurrently to upwardly flowing liquid oil, the improved method of withdrawing the adsorbent from the lower section of the treating zone at controlled rates, which comprises: gravitating adsorbent from the lower section of the treating zone as a substantially compact column; adding liquid oil to said column adjacent its lower end and suspending adsorbent in the oil so added; passing the suspension upwardly through a confined transport passage which extends upwardly from a downwardly facing open inlet end that is in free and open communication with the lower section of the seal column; discharging the suspension from said transport passage through only one of a plurality of outlet passages connecting into said transport passage at a plurality of vertically spaced-apart levels, all lying substantially below the liquid level maintained in the treating zone, said outlet passages each having a flow capacity at least equal to said transport passage; and controlling the rate of adsorbent removal from the treating zone by selecting the one of said outlet passages for use which gives a rate of flow closest to the desired rate of flow and then adjusting the rate to the desired rate by adjusting the rate of liquid oil supply to the lower end of the seal column.

5. In a continuous process for washing a granular adsorbent with naptha to free the adsorbent from adhering liquid oil, the improved method of removing the adsorbent from the lower section of the washing zone, which comprises: gravitating adsorbent downwardly from the lower section of the washing zone as a columnar mass admixed with liquid naphtha; injecting a stream of liquid naphtha into the lower section of said columnar mass and suspending adsorbent from the columnar mass in liquid so injected; passing the suspension upwardly through a confined transport passage whose downwardly facing open discharge end is in free and open communication with the lower section of said columnar mass; maintaining the velocity of the liquid within said transport passage above 0.1 foot per second, so as to maintain said adsorbent in suspension throughout the entire length of said transport passage; removing the suspension from the transport passage through only one of a plurality of outlet passages that extend from said lift passage at a plurality of vertically spaced-apart levels, all of which lie below the level of liquid naphtha maintained in the washing zone; and controlling the rate of granular solids removal by removing the suspension through the one of said outlet passages which gives a granular solids flow rate closest to the desired flow rate and, then, adjusting the rate of supply of naphtha to the lower end of the columnar mass to adjust the rate exactly to the desired granular solids flow rate.

6. In a continuous lubricating oil decolorization process wherein the liquid oil is passed upwardly through a confined treating zone countercurrently to a downwardly moving columnar mass of granular adsorbent and wherein the adsorbent, after use, is washed by means of a suitable liquid solvent to remove adhering oil therefrom and wherein the temperature at which the decolorization is conducted is above the boiling point of the solvent, the improved method of transferring the spent absorbent from the treating zone to the washing zone at controlled rates, which comprises removing the spent adsorbent admixed with liquid oil from the lower section of the treating zone and passing it downwardly as a substantially compact seal column; injecting a stream of liquid oil into the lower section of said seal column and suspending adsorbent in the oil so injected; passing the suspension upwardly through a confined transport passage whose downwardly facing open discharge end is in free and open communication with said seal column; removing the suspension from the transport passage through only one of a plurality of outlet passages extending from the transport passage at a plurality of vertically spaced-apart levels, all of which lie below the liquid level maintained in the treating zone, said outlet passages each having a flow capacity at least equal to said transport passage; controlling the difference in height between the liquid level in the treating zone and the height to which the suspension rises in the transport passage; controlling said difference in height by selectively removing the suspension through the one of said outlet passages which gives the difference in height required to accomplish the desired rate of granular solids removal; passing the liquid oil-granular solids mixture from the outlet passage into the washing zone; and cooling the mixture to a temperature suitable for use in the washing zone by contacting the mixture with cool liquid solvent before it reaches the washing zone but after it has left the transport passage.

7. In a continuous lubricating oil purification process wherein the oil is contacted with a granular adsorbent to remove small amounts of undesirable impurities from the oil, and in which the adsorbent is reconditioned for re-use in the treating step by burning the undesirable components from the adsorbent in a regeneration zone, the improved method of conditioning the adsorbent after removal from the treating zone to be passed to the regeneration zone to avoid excessive losses of liquid oil by burning in the regeneration zone, which comprises: passing the spent adsorbent admixed with liquid oil from the treating zone into a confined washing zone; maintaining a downwardly gravitating columnar mass of adsorbent within said washing zone and supplying said mixture of oil and adsorbent to the upper section of said mass; introducing a liquid solvent into said washing zone at a level substantially above the lower end of the columnar mass but substantially below the upper end of said mass and passing said solvent upwardly through the mass to effect removal of the oil from the adsorbent by solution in the solvent; removing the solvent-oil solution from the upper section of the washing zone and fractionating said solution into an oil component and a solvent component, and returning said oil component to the treating zone; removing the washed adsorbent from the lower section of the columnar mass and passing said adsorbent downwardly as a confined substantially compact seal column, supplying a stream of wash solvent to the lower section of said column and suspending adsorbent from the seal column in said stream; passing the suspension upwardly through a confined transport passage whose downwardly facing open discharge end is in free and open communication with said seal column and whose cross-section is substantially less than the cross-section of said column; removing the suspension from the transport passage through only one of a plurality of outlet passages which communicate with said transport passage at a plurality of levels, all lying below the liquid level in the washing zone; controlling the rate of granular solids removal from the washing zone, at least in part, by controlling the difference in height between the liquid level in the contacting zone and the height to which the suspension rises in the transport passage, said latter height being adjusted by selective removal of the suspension through the one of said outlet passages which gives the desired difference in height; passing the solvent-adsorbent mixture after removal from the transport passage into a confined drying zone and evaporating the solvent from the adsorbent in the drying zone; condensing the evaporated solvent and returning it to the washing zone and passing the dried adsorbent to the regeneration zone.

8. The process of claim 7 further limited to draining excess solvent from the adsorbent after it is removed from the lift passage and before it enters the drying zone.

9. In a continuous process for contacting liquids and granular solids, the improved method of withdrawing the granular solids from the contacting zone, which comprises: gravitating the granular solids from the contacting zone as a substantially compact column; adding liquid to said column adjacent its lower end and suspending solids in the liquid so added; passing the suspension upwardly through a confined transport passage which extends upwardly from a downwardly facing open inlet end that is in free and open communication with the lower section of the seal column; discharging the suspension from only one of a plurality of outlet passages connecting into said transport passage at a plurality of vertically spaced-apart levels, all lying below the liquid level existing in the contacting zone, said outlet passages all having a flow capacity at least equal to the transport passage; and controlling the rate of solid removal from the contacting zone by using the one of said outlet passages which gives a rate of flow closest above the desired rate of flow and adjusting the rate to the desired rate by interposing a variable opening flow restriction in the transport passage.

References Cited in the file of this patent
UNITED STATES PATENTS

| 11,675 | Middleton | Sept. 12, 1854 |
| 756,439 | Vrooman | Apr. 5, 1904 |
| 2,006,191 | Anderson | June 25, 1935 |
| 2,519,342 | Berg | Aug. 22, 1950 |
| 2,614,133 | Ockert | Oct. 15, 1952 |